May 1, 1962  J. J. SANDERSON  3,032,521
AQUEOUS COATING COMPOSITION CONTAINING AN ACRYLIC
RESIN AND AN ORGANIC SOLVENT AND SUBSTRATE
COATED THEREWITH
Filed July 23, 1953
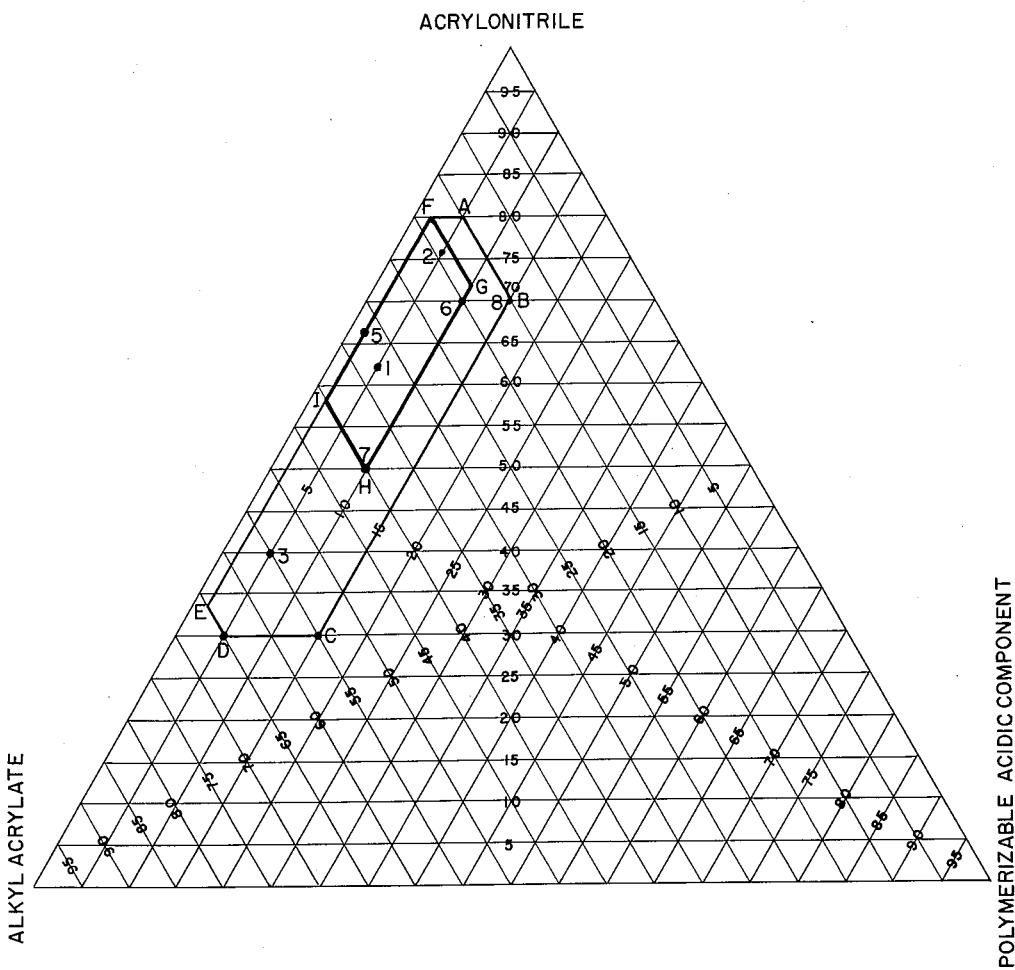
INVENTOR
*James J. Sanderson*
BY
AGENT United States Patent Office 3,032,521
Patented May 1, 1962

3,032,521
AQUEOUS COATING COMPOSITION CONTAINING AN ACRYLIC RESIN AND AN ORGANIC SOLVENT AND SUBSTRATE COATED THEREWITH
James J. Sanderson, Drexel Hill, Pa., assignor to E. I. du Pont de Nemours and Company, Wilmington, Del., a corporation of Delaware
Filed July 23, 1953, Ser. No. 369,890
7 Claims. (Cl. 260—29.6)

This invention relates to acrylic interpolymers, particularly to tripolymers derived from acrylonitrile, alpha-olefinic monocarboxylic acid and an alkyl acrylate, more particularly to aqueous dispersions of the tripolymers, still more particularly to coating compositions containing them and process of making same.

Many varieties of coating compositions have been used in the past based on various polymeric materials. The coatings are generally deposited from a solution of the film forming components in volatile organic solvents. Few are deposited from an aqueous dispersion.

The solution type coatings have the disadvantage of the presence of volatile organic solvents, which are costly and sometimes noxious. Solvent recovery systems to salvage the volatile solvents offset the cost in part. Another disadvantage of the solution type of coating compositions is that the viscosity of the coating varies significantly with the amount of dissolved film former and its molecular weight. Application characteristics of polymer solutions necessitate applying numerous coats of the coating at relatively low solids.

The preferred aqueous dispersion coatings of this invention avoid the disadvantages of the solution type coating by use of water as the predominating component of the volatile vehicle and permits use of higher molecular weight polymers than is possible with polymer solutions. The dispersions are applicable as high coating solids.

The primary object of this invention is to provide novel acrylic interpolymers. A further object is the preparation of coating compositions based on the novel acrylic interpolymers. A still further object is the preparation of aqueous dispersion coating compositions containing the novel acrylic interpolymers. A still further object is the application of the coating composition containing the novel acrylic interpolymers to metal and non-metallic substrates. A still further object is to provide coatings having desirable electrical insulating properties. These and other important objects will become readily apparent as the description of the invention proceeds.

These and other important objects are accomplished in accordance with this invention by blending (A) acrylonitrile, (B) alpha-olefinic monocarboxylic acid selected from the group consisting of acrylic acid, methacrylic acid, ethacrylic acid, phenyl acrylic and crotonic acid, and (C) an ester of said alpha-olefinic monocarboxylic acids with a saturated aliphatic monohydric alcohol of 1 to 8 carbon atoms, the monomers being present in certain critical proportions, and subjecting the mixture of monomers to polymerizing conditions to form water-insoluble polymers.

In the drawing, the single FIGURE is a triangular graph showing the operative and preferred ranges based on the total weight of the three essential components of the polymerizable monomeric mixture. The term "alkyl acrylate" in the drawing is used generically to designate esters of acrylic acid and esters of alpha or beta substituted acrylic acid.

The invention is illustrated but is not limited to the following specific examples in which the parts and percentages figures are expressed on a weight basis.

*Example 1*

| Polymerizable monomers: | Parts by wt. |
|---|---|
| Acrylonitrile | 63.0 |
| Butyl acrylate | 32.0 |
| Methacrylic acid | 5.0 |
| Polymerization initiator: | |
| Sodium bisulfite | 0.1 |
| Potassium persulfate | 0.3 |
| Dispersing agent: | |
| Sodium "Lorol" sulfate | 2.0 |
| Water | 200.0 |

*Example 2*

| Polymerizable monomers: | |
|---|---|
| Acrylonitrile | 76.0 |
| Butyl acrylate | 19.0 |
| Methacrylic acid | 5.0 |
| Polymerization initiator: | |
| Sodium bisulfite | 0.1 |
| Potassium persulfate | 0.3 |
| Dispersing agent: | |
| Sodium "Lorol" sulfate | 2.0 |
| Water | 200.0 |

*Example 3*

| Polymerizable monomers: | |
|---|---|
| Acrylonitrile | 40.0 |
| Butyl acrylate | 55.0 |
| Methacrylic acid | 5.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

*Example 4*

| Polymerizable monomers: | |
|---|---|
| Acrylonitrile | 30.0 |
| Butyl acrylate | 65.0 |
| Methacrylic acid | 5.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

*Example 5*

| Polymerizable monomers: | |
|---|---|
| Acrylonitrile | 65.8 |
| Butyl acrylate | 32.2 |
| Methacrylic acid | 2.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Tellogen: | |
| Dodecyl mercaptan | .6 |
| Water | 200.0 |

Example 6

| Polymerizable monomers: | Parts by wt. |
|---|---|
| Acrylonitrile | 70.0 |
| Octyl acrylate | 20.0 |
| Acrylic acid | 10.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 7

| Polymerizable monomers: | |
|---|---|
| Acrylonitrile | 55.0 |
| Ethyl acrylate | 35.0 |
| Crotonic acid | 10.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 8

| Polymerizable monomers: | |
|---|---|
| Acrylonitrile | 70.0 |
| 2-ethyl butyl acrylate | 15.0 |
| Methacrylic acid | 15.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 9

| Polymerizable monomers: | |
|---|---|
| Acrylonitrile | 30.0 |
| Methyl acrylate | 55.0 |
| Methacrylic acid | 15.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

In Examples 1 to 9 the polymerization reactions are carried out under an atmosphere of an inert gas, such as, e.g. nitrogen, in a suitable polymerization vessel equipped with stirrer, reflux column, thermometer and an inert gas inlet. Before the polymerizable monomers are added to the water it is deoxygenated by refluxing for about 15 minutes under the atmosphere of nitrogen and cooled to about 150° F. The dispersing agent is added to the deoxygenated water along with the sodium bisulfite, after which the mixture of polymerizable monomers is added, followed by the addition of an aqueous solution of potassium persulfate. The aqueous polymerization charge is maintained at about 140° F. for about 2 hours or until the polymerization reaction is complete. Although the preferred polymerization temperature is about 140° F., the polymerization may be carried out at room temperature or as high as the refluxing temperature of the polymerization charge. After the polymerization reaction has run to completion the heated aqueous interpolymer dispersions are freed of residual residual monomers by blowing with air, which also removes some of the water thereby concentrating the dispersion.

The tripolymers of this invention are derived from mixtures of monomeric polymerizable components varying within the following operative ranges:

| | Parts |
|---|---|
| Acrylonitrile | 30 to 80 |
| Alpha-olefinic monocarboxylic acid | 2 to 15 |
| Alkyl acrylate | 15 to 65 | for a total of 100 parts of the mixture of polymerizable monomers. These respective operative ranges are represented by the polygon ABCDEF of the drawing.

The preferred ranges are:

| | Parts |
|---|---|
| Acrylonitrile | 50 to 80 |
| Alpha-olefinic monocarboxylic acid | 2 to 10 |
| Alkyl acrylate | 18 to 40 | for a total of 100 parts of the mixture. These respective preferred ranges are represented by the polygon FGHI of the drawing.

Example 10

A wire enamel was prepared from the aqueous tripolymer of Example 1 in accordance with the following formula:

| | Parts by wt. |
|---|---|
| Aqueous interpolymer of Example 1 (36.2% solids) | 69.5 |
| Tetramethylene sulfone | 7.6 |
| Aqueous ammonium hydroxide (28% $NH_3$) to pH value of 9.1 | 1.4 |
| Water | 21.5 |

The above wire enamel composition was applied to #25 copper magnet wire at a rate of about 10 feet per minute by passing it upwardly through a column of the aqueous coating composition. Prewetting the wire before each coat with a 1% aqueous solution of a wetting agent, such as, e.g. sodium "Lorol" sulfate, facilitated the deposition of the wire enamel composition. After each successive coat the coated wire was passed through an oven having an air temperature of about 600–700° F. and of such length that the exposure of the coated wire to the high heat was about 20 seconds.

The diameter of the dry coated wire was 2.2 mils greater than the uncoated wire, thus the dry film thickness was 1.1 mils.

The magnet wire coated with the above enamel had a dielectric breakdown value of 3820 volts per mil of coating thickness.

Example 11

A white sidewall tire paint was prepared from the aqueous tripolymer dispersion of Example 4 in accordance with the following formula:

| | Parts by wt. |
|---|---|
| Aqueous dispersion of Example 4 (35.3% solids) | 31.4 |
| Pigmented mill base [1] | 17.6 |
| Aqueous ammonium hydroxide (28% $NH_3$) to pH value of 9.0 | 2.0 |
| Water | 49.0 |
| | 100.0 |

| | |
|---|---|
| Titanium dioxide | 32.5 |
| China clay | 7.4 |
| Water | 59.7 |
| 1% aqueous solution octyl phenyl polyglycol ether ("Triton X–100") | .4 |
| | 100.0 |

[1] Pigmented mill base—(pebble mill grind).

The above pigmented composition was applied to black sheet tire stock. It air dried tack-free in about 30 minutes. After drying over-night the coating retained its whiteness since it extracted very little anti-oxidant. It had very good adhesion to rubber and good flexibility.

Example 12

A metal primer composition was prepared as follows:

| | Parts by wt. |
|---|---|
| Aqueous dispersion of Example 5 (solids 32.2%) | 51.0 |
| Tetramethylene sulfone | 6.4 |
| Phosphoric acid | .7 |
| Water | 41.9 |
| | 100.0 |

A plain steel metal panel was sanded and washed with toluene and dried. It was then dipped into the above primer composition and the excess was allowed to drain. The dipped panel was baked 30 minutes at 350° F.

The dry film thickness was .5 mil. The dry film had excellent adhesion to the metal and good impact resistance. The primed metal surface provided an excellent substrate for subsequent application of conventional lacquer and synthetic resin finishes, such as, e.g., automotive finishes.

The aqueous dispersions of the interpolymers described in Examples 1 to 9 may be used in formulating coating compositions for numerous other uses, such as, e.g., outside house paints, architectural paints, masonry paints, finishing coats for refrigerators, washing machines, kitchen cabinets, etc. They may also be used in coating flexible substrates, such as, e.g. leather, paper, textile fabrics, including those made from cotton, rayon, nylon, glass, polyacrylonitrile and polyethylene terephthalate.

The examples illustrate the use of methacrylic, acrylic and crotonic acids. In place of these alpha-olefinic monocarboxylic acids it is also within the scope of this invention to use ethacrylic acid and phenyl acrylic acid in like amounts in the examples. However, methacrylic acid is particularly preferred because of its polymerization rate.

In addition to the alkyl acrylates shown in the examples it is to be understood that other esters of the aforementioned alpha-olefinic monocarboxylic acids with saturated aliphatic monohydric alcohols of 1 to 8 carbon atoms may be used, such as, e.g. the methyl, ethyl, propyl, isopropyl, butyl, isobutyl, amyl, hexyl, 2-ethyl butyl, cyclohexyl, heptyl and octyl alcohols.

It will be readily apparent to those skilled in the art that the coating compositions of this invention may be further modified by the addition of plasticizers, stabilizers, pigments, extenders and other film formers.

When coating compositions based on the tripolymers of this invention have a major proportion of acrylonitrile, they are preferably formulated with a water-soluble organic liquid which is a solvent for the tripolymer to facilitate coalescence of the film when it is to be dried at room temperature or slightly elevated temperatures. The presence of coalescing agents cause the aqueous dispersions to be less critical to application conditions. However, the presence of the coalescing agent is not essential to satisfactory application of the coating composition when sufficient heat is employed to bring about coalescence. Where drying is carried out at room temperature or under moderate heat (200–250° F.) the coalescing agent may be present in an amount up to 15% by weight of the interpolymer. In the examples the coalescing agent is shown to be tetramethylene sulfone. Other examples of water-soluble coalescing agents which may be employed include cyclic ethylene carbonate, dimethyl formamide, dimethyl acetamide, alkyl mono-ethers of ethylene glycol or diethylene glycol and diacetone alcohol.

In the specific examples for the polymerization reaction sodium "Lorol" sulfate is the dispersing agent for the interpolymer. Other ionic and non-ionic dispersing agents used in emulsion polymerization may be used in place thereof since the invention does not depend on any particular dispersing agent. The amount of dispersing agent may vary between 0.25% and 4%, based on the weight of polymerizable monomers. The preferred content is about .5%. All of the wetting agent may be added to the polymerization charge or part may be added to the aqueous dispersion of the interpolymer.

The redox (reduction/oxidation) polymerization initiator combination, in the specific examples, is illustrated as being sodium bisulfite and potassium persulfate in the ratio of 1:3. This ratio may vary from 1:1 to 1:10. The amount of redox combination may vary, as is well known by those skilled in the art. Other redox combinations can be used in place of the sulfite/persulfate combination. Other conventional polymerization initiators may be used, such as, e.g. inorganic peroxides, organic peroxides, salts of inorganic peroxides, and azo nitrile catalysts.

The use of a telogen (polymer chain terminator) is illustrated in Example 5 to control the molecular weight of the tripolymer.

In the preferred embodiment of this invention the tripolymers are prepared by emulsion polymerization in an aqueous medium and the coating compositions are prepared directly therefrom without isolating the resin. However, the tripolymers may be separated from the aqueous medium and dissolved in organic solvents for the tripolymers in the preparation of coating compositions. It is also possible to polymerize the monomer mixture in an organic liquid which is a solvent for the tripolymers. However, the tripolymers of this invention of a molecular weight sufficiently high for most uses are insufficiently soluble in conventional solvents to provide practical solution type coating compositions. For this reason the polymerization is preferably carried out in an aqueous medium to provide practical aqueous dispersions.

The interpolymer aqueous dispersions as produced generally have a pH in the range of about 3.5 to 5.5. Although these dispersions may be formulated into coating compositions under this acidic condition, better coalescing results and smoother films are obtained when the dispersions are applied at a pH value in the range of 7–10 and preferably at a pH of about 9.0 when using ammonium hydroxide to provide the alkalinity.

In place of ammonium hydroxide other volatile alkaline materials which do not form strong electrolytes may be used to adjust the pH to an alkaline condition, such as, e.g. monoethanol amine, triethanol amine and n-butyl amine.

Compositions of this invention provide for significant economy through the use of an aqueous volatile vehicle. The use of innocuous solvents is eliminated. The acrylic interpolymer dispersions are economically prepared from readily available components.

Many modifications and different embodiments of this invention may be made without departing from the spirit and scope thereof and it is to be understood that the invention is not limited to the specific embodiments disclosed except as defined in the appended claims.

I claim:

1. A coating composition having a continuous aqueous phase and a dispersed phase containing a water insoluble interpolymer of a monomer mixture consisting of (A) 30 to 80 parts by weight of acrylonitrile, (B) 2 to 15 parts by weight of alpha-olefinic monocarboxylic acid selected from the group consisting of acrylic acid, methacrylic acid, ethacrylic acid, phenyl acrylic acid, and crotonic acid, and (C) 15 to 65 parts by weight of an ester of at least one of said alpha-olefinic monocarboxylic acids with a saturated aliphatic monohydric alcohol of 1 to 8 carbon atoms, said continuous aqueous phase containing, in amount up to 150% based on the weight of said interpolymer, water soluble, volatile, organic liquid, having a rate of volatilization less than that of water, which is a solvent for said interpolymer.

2. A composition of claim 1 in which the coalescing agent is at least one member of the group consisting of tetramethylene sulfone, cyclic ethylene carbonate, dimethyl formamide, dimethyl acetamide, diacetone alcohol, water soluble alkyl monoethers of ethylene glycol, and water soluble alkyl monoethers of diethylene glycol.

3. A composition of claim 2 in which the coalescing agent is tetramethylene sulfone.

4. A composition of claim 1 in which the dispersed phase contains a pigment.

5. A coating composition having a pH in the range of 7.0 to 10.0 and consisting of a continuous aqueous phase and a dispersed phase containing a water insoluble interpolymer of a monomer mixture consisting of (A) 50 to 80 parts by weight of acrylonitrile, (B) 2 to 10 parts by weight of alpha-olefinic monocarboxylic acid selected from the group consisting of acrylic acid, methacrylic acid, ethacrylic acid, phenyl acrylic acid, and crotonic acid, and (C) 18 to 40 parts by weight of an ester of at least one of said alpha-olefinic monocarboxylic acids with a saturated aliphatic monohydric alcohol of 1 to 8 carbon atoms, said continuous aqueous phase containing tetramethylene sulfone in amount up to 150% based on the weight of said interpolymer.

6. A composition of claim 5 in which the monocarboxylic acid monomer (B) is methacrylic acid, and the ester monomer (C) is butyl acrylate.

7. A substrate coated with a composition of claim 1.

References Cited in the file of this patent

UNITED STATES PATENTS

| | | |
|---|---|---|
| 1,981,102 | Hagedorn et al. | Nov. 20, 1934 |
| 2,160,054 | Bauer | May 30, 1939 |
| 2,404,722 | Houtz | July 23, 1946 |
| 2,436,926 | Jacobson | Mar. 2, 1948 |
| 2,654,721 | Lytton | Oct. 6, 1953 |

UNITED STATES PATENT OFFICE
CERTIFICATE OF CORRECTION

Patent No. 3,032,521            May 1, 1962

James J. Sanderson

It is hereby certified that error appears in the above numbered patent requiring correction and that the said Letters Patent should read as corrected below.

Column 1, line 37, for "as" read -- at --; column 3, line 70, strike out "residual"; column 5, line 60, for "15%" read -- 150% --.

Signed and sealed this 21st day of August 1962.

(SEAL)
Attest:

ESTON G. JOHNSON
Attesting Officer

DAVID L. LADD
Commissioner of Patents